US011815612B2

(12) United States Patent
Englund

(10) Patent No.: US 11,815,612 B2
(45) Date of Patent: Nov. 14, 2023

(54) DETERMINING A POSITION OF A MOBILE KEY DEVICE BASED ON PHASE DIFFERENCE OF SAMPLES

(71) Applicant: ASSA ABLOY AB, Stockholm (SE)

(72) Inventor: Martin Englund, Handen (SE)

(73) Assignee: ASSA ABLOY AB, Stockholm (SE)

( * ) Notice: Subject to any disclaimer, the term of this patent is extended or adjusted under 35 U.S.C. 154(b) by 94 days.

(21) Appl. No.: 17/607,574

(22) PCT Filed: May 26, 2020

(86) PCT No.: PCT/EP2020/064581
§ 371 (c)(1),
(2) Date: Oct. 29, 2021

(87) PCT Pub. No.: WO2020/239768
PCT Pub. Date: Dec. 3, 2020

(65) Prior Publication Data
US 2022/0221544 A1 Jul. 14, 2022

(30) Foreign Application Priority Data
May 29, 2019 (EP) .................................... 19177346

(51) Int. Cl.
*G01S 3/48* (2006.01)
*G01S 5/06* (2006.01)
(Continued)

(52) U.S. Cl.
CPC .................. *G01S 3/48* (2013.01); *G01S 5/06* (2013.01); *G06K 7/10366* (2013.01); *G07C 9/29* (2020.01)

(58) Field of Classification Search
CPC .......... G01S 3/48; G01S 5/06; G01S 2209/63; G01S 13/84; G01S 11/02; G01S 13/0209;
(Continued)

(56) References Cited

U.S. PATENT DOCUMENTS 3,903,522 A 9/1975 Copeland
5,565,764 A 10/1996 Priebe et al.
(Continued)

FOREIGN PATENT DOCUMENTS

CN 1233041 10/1999
CN 101388065 3/2009
(Continued)

OTHER PUBLICATIONS

Official Action with English Translation for China Patent Application No. 202080039050.4, dated Jan. 5, 2023, 12 pages.
(Continued)

*Primary Examiner* — Dionne Pendleton
(74) *Attorney, Agent, or Firm* — Schwegman Lundberg & Woessner, P.A.

(57) ABSTRACT

It is provided a method comprising the steps of: obtaining a first sample point and a second sample point; transforming the first sample point and the second sample point by setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point; determining the phase difference between the first sample point and the second sample point; and determining the position of the mobile key device based on the phase differences.

8 Claims, 4 Drawing Sheets

(51) Int. Cl.
*G07C 9/29* (2020.01)
*G06K 7/10* (2006.01)

(58) Field of Classification Search
CPC ...... G01S 13/325; G01S 13/34; G01S 13/765;
G01S 13/767; G01S 13/931; G01S
2013/9316; G01S 2013/9321; G01S
2205/01; G01S 5/02; G01S 5/021; G01S
5/0273; G01S 5/0278; G01S 5/0284;
G01S 5/08; G01S 5/14; G01S 5/18; G01S
7/006; G01S 7/021; G06K 7/10366;
G07C 2209/63; G07C 9/00309; G07C
9/29; G07C 2009/00388; G07C
2009/00555; G07C 2209/61; G07C
9/00944; G07C 9/28; H04W 12/08;
H04W 12/122; H04W 12/128; H04W
12/64; H04W 4/023; H04W 4/40; H04W
64/00; H04L 1/02; H04L 27/2003; H04L
27/26; H04L 27/2601; H04L 27/2663;
H04L 27/2665; H04L 27/28; H04L 67/12;
H04J 13/12; H04B 1/69; H04B 1/7073;
H04B 17/318; H04B 7/0669; H04B
7/0691; H04B 7/10; H04B 7/15; H01Q
1/3241; H01Q 1/3275; H01Q 13/10;
H01Q 25/00; H01Q 25/04; H01Q 9/0435;
H01Q 9/0464; G06F 3/043; G06F 3/0433;
B60R 2325/108; B60R 2325/205; B60R
25/2072; B60R 25/241; B60R 25/245;
B60R 25/246
See application file for complete search history.

(56) References Cited

U.S. PATENT DOCUMENTS

| | | | | |
|---|---|---|---|---|
| 9,194,936 | B1* | 11/2015 | Keegan | H04L 27/28 |
| 2004/0046695 | A1 | 3/2004 | Brothers, Jr. et al. | |
| 2014/0241549 | A1 | 8/2014 | Stachurski et al. | |
| 2014/0340366 | A1* | 11/2014 | Poulsen | G06F 3/043 |
| | | | | 345/177 |
| 2015/0016628 | A1 | 1/2015 | Li | |
| 2016/0146931 | A1 | 5/2016 | Rao et al. | |
| 2017/0310758 | A1* | 10/2017 | Davis | H04B 1/69 |
| 2018/0052217 | A1 | 2/2018 | Jonsson | |
| 2020/0120509 | A1* | 4/2020 | Stitt | H04W 12/128 |

FOREIGN PATENT DOCUMENTS

| | | |
|---|---|---|
| CN | 105393448 | 3/2016 |
| CN | 107430792 | 12/2017 |
| EP | 0137745 | 4/1985 |
| EP | 0930612 | 7/1999 |
| EP | 2362681 | 8/2011 |
| EP | 3073284 | 9/2016 |
| WO | WO 2012/063532 | 5/2012 |

OTHER PUBLICATIONS

Extended Search Report for European Patent Application No. 19177346.4, dated Dec. 16, 2019, 8 pages.
International Search Report and Written Opinion for International (PCT) Patent Application No. PCT/EP2020/064581, dated Sep. 10, 2020, 12 pages.

* cited by examiner

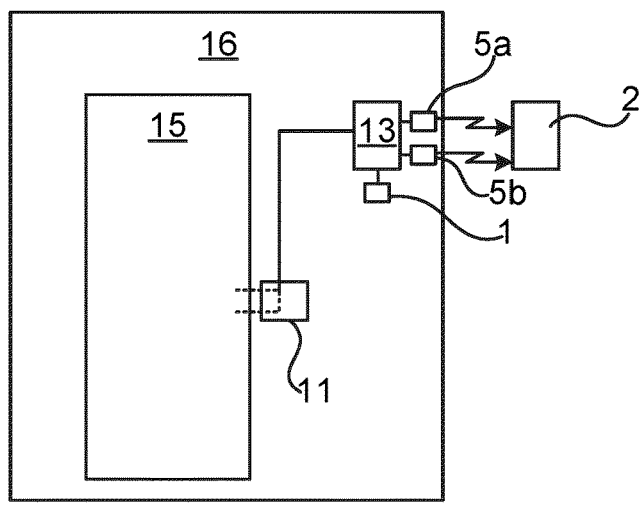
Fig. 1
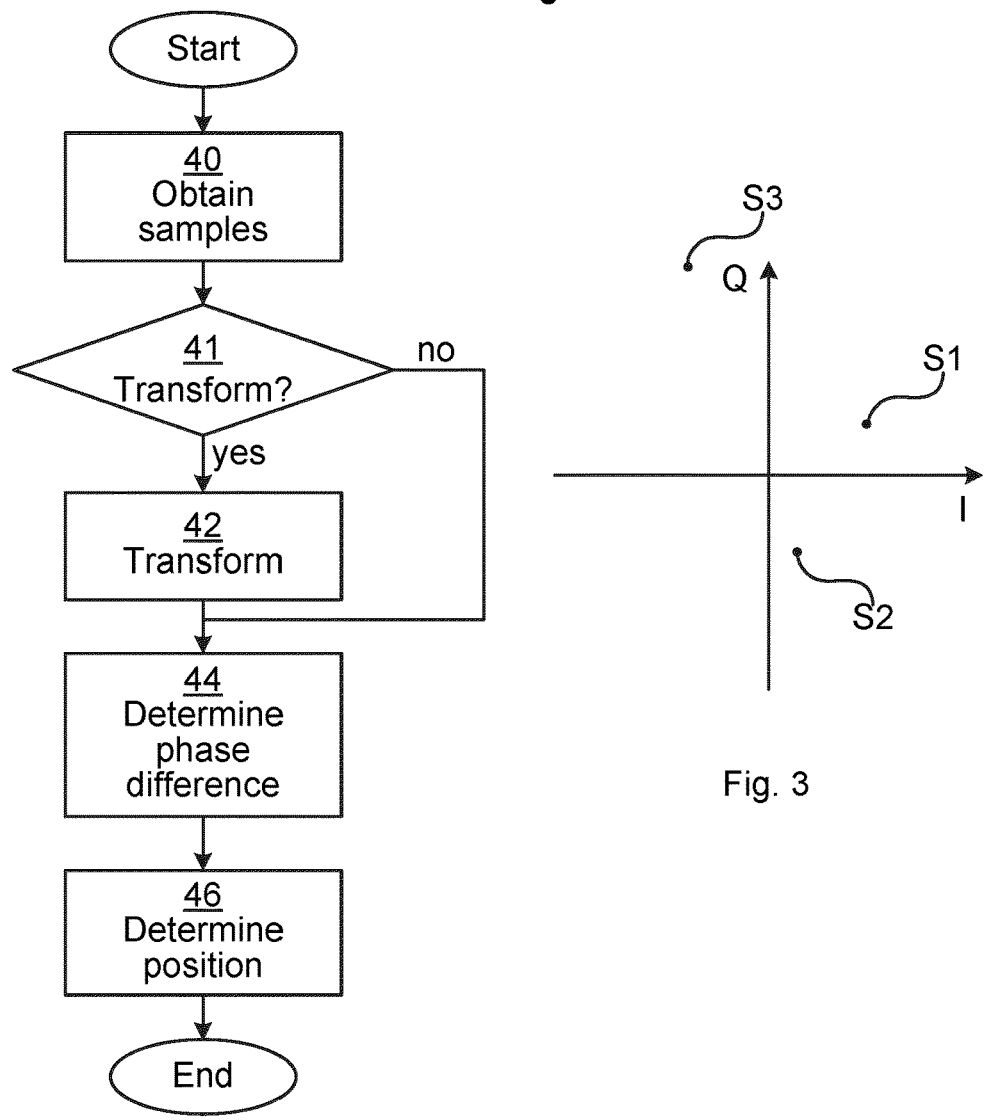
Fig. 2
Fig. 3

DETERMINING A POSITION OF A MOBILE KEY DEVICE BASED ON PHASE DIFFERENCE OF SAMPLES

CROSS REFERENCE TO RELATED APPLICATIONS

This application is a national stage application under 35 U.S.C. 371 and claims the benefit of PCT Application No. PCT/EP2020/064581 having an international filing date of May 26, 2020, which designated the United States, which PCT application claimed the benefit of Europe Patent Application No. 19177346.4 filed May 29, 2019, the disclosure of each of which are incorporated herein by reference.

TECHNICAL FIELD

The present disclosure relates to the field of mobile key positioning, and in particular to determining a position of a mobile key device base on a phase difference between different samples.

BACKGROUND

Lock devices and key devices are evolving from the traditional pure mechanical locks. These days, there are wireless interfaces for electronic lock devices, e.g. by interacting with a mobile key device. For instance, Radio Frequency Identification (RFID) has been used as the wireless interface. When RFID is used, the user needs to present the mobile key device very close to a reader of the lock. However, in order to provide a more user-friendly solution, wireless interfaces with greater range are starting to be used. This allows the interaction between the mobile key device and the lock to occur without user interaction, e.g. with a mobile key device being located in a pocket or handbag. However, in such a situation, there is a risk that someone on the inside unlocks the lock device by simply walking by the lock device. In order to prevent this from happening, without introducing user interaction to open the lock device, there needs to be a way to determine the position of the mobile key device, e.g. to determine whether a mobile key device is on the inside or on the outside. In this way, automatic access control could be disabled for inside devices, preventing inadvertent unlocking.

When determining position of a mobile key device, one technology that can be used is called angle of arrival, which determines an incidence angle of the mobile key device based on measuring a signal received from the mobile key device using multiple antennas. The incidence angle can be calculated based on a phase difference between two samples from two respective antennas.

EP 3 073 284 A1 discloses a method, device, computer program and computer program product for determining whether a portable key device is located in an active area in relation to a barrier. WO 2012/063532 A1 discloses an arrival angle calculation device. EP 0 137 745 A2 discloses direction finding systems.

However, when calculating the phase difference based on two samples, using an inverse tangent function is not reliable as the inverse tangent is only defined for a subset of all possible phase differences, leading to unreliable and inconclusive results.

SUMMARY

One objective is to improve reliability in how phase differences between samples, used in angle of arrival calculations, are calculated.

According to a first aspect, it is provided a method for determining a position of a mobile key device. The method being performed by a position determiner and comprises the steps of: obtaining a first sample point comprising a first in-phase, I, value and a first quadrature, Q, value, and a second sample point, comprising a second I value and a second Q value, the first sample point indicating a signal received from the mobile key device using a first antenna and the second sample point indicating a signal received from the mobile key device using a second antenna; determining that a transformation condition is true by determining that the obtained first sample point is in the first quadrant and the obtained second sample point is in the second quadrant, that the obtained first sample point is in the second quadrant and the obtained second sample point is in the first quadrant, that the obtained first sample point is in the third quadrant and the obtained second sample point is in the fourth quadrant, or that the obtained first sample point is in the fourth quadrant and the obtained second sample point is in the third quadrant; transforming the first sample point and the second sample point according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point; determining the phase difference between the first sample point and the second sample point by applying an inverse tangent function based on the result of the transforming; and determining the position of the mobile key device based on the phase differences.

The step of obtaining may comprise obtaining multiple instances of the first sample point and calculating an average of the multiple instances of the first sample point for subsequent processing; and obtaining multiple instances of the second sample point and calculating an average of the multiple instances of the second sample point for subsequent processing.

The step of determining the phase difference may comprise determining the phase difference several times and averaging the several phase differences for subsequent processing.

According to a second aspect, it is provided a position determiner for determining a position of a mobile key device. The position determiner comprises: a processor; and a memory storing instructions that, when executed by the processor, cause the position determiner to: obtain a first sample point and a second sample point, each one of the sample points comprising an in-phase, I, value and a quadrature, Q, value, the first sample point indicating a signal received from the mobile key device using a first antenna and the second sample point indicating a signal received from the mobile key device using a second antenna; determine that a transformation condition is true by determining that the obtained first sample point is in the first quadrant and the obtained second sample point is in the second quadrant, that the obtained first sample point is in the second quadrant and the obtained second sample point is in the first quadrant, that the obtained first sample point is in the third quadrant and the obtained second sample point is in the fourth quadrant, or that the obtained first sample point is in the fourth quadrant and the obtained second sample point is in the third quadrant; transform the first sample point and the second sample point according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point; determine the phase difference between the first sample point and the second sample point by applying an inverse tangent function based on the result of the transforming; and determine the position of the mobile key device based on the phase difference.

The instructions to obtain may comprise instructions that, when executed by the processor, cause the position determiner to obtain multiple instances of the first sample point and calculate an average of the multiple instances of the first sample point for subsequent processing; and obtain multiple instances of the second sample point and calculate an average of the multiple instances of the second sample point for subsequent processing.

The instructions to determine the phase difference may comprise instructions that, when executed by the processor, cause the position determiner to determine the phase difference several times and averaging the several phase differences for subsequent processing.

According to a third aspect, it is provided a computer program for determining a position of a mobile key device. The computer program comprises computer program code which, when run on a position determiner causes the position determiner to: obtain a first sample point and a second sample point, each one of the sample points comprising an in-phase, I, value and a quadrature, Q, value, the first sample point indicating a signal received from the mobile key device using a first antenna and the second sample point indicating a signal received from the mobile key device using a second antenna; determine that a transformation condition is true by determining that the obtained first sample point is in the first quadrant and the obtained second sample point is in the second quadrant, that the obtained first sample point is in the second quadrant and the obtained second sample point is in the first quadrant, that the obtained first sample point is in the third quadrant and the obtained second sample point is in the fourth quadrant, or that the obtained first sample point is in the fourth quadrant and the obtained second sample point is in the third quadrant; transform the first sample point and the second sample point according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point; determine the phase difference between the first sample point and the second sample point by applying an inverse tangent function based on the result of the transforming; and determine the position of the mobile key device based on the phase difference.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 1 is a schematic diagram showing an environment in which embodiments presented herein can be applied;

FIG. 2 is a flow chart illustrating an embodiment of a method performed in the position determiner of FIG. 1 for determining a position of a mobile key device;

FIG. 3 is a schematic graph illustrating samples in an IQ (in-phase, quadrature) plane;

DETAILED DESCRIPTION

Figure 4A:
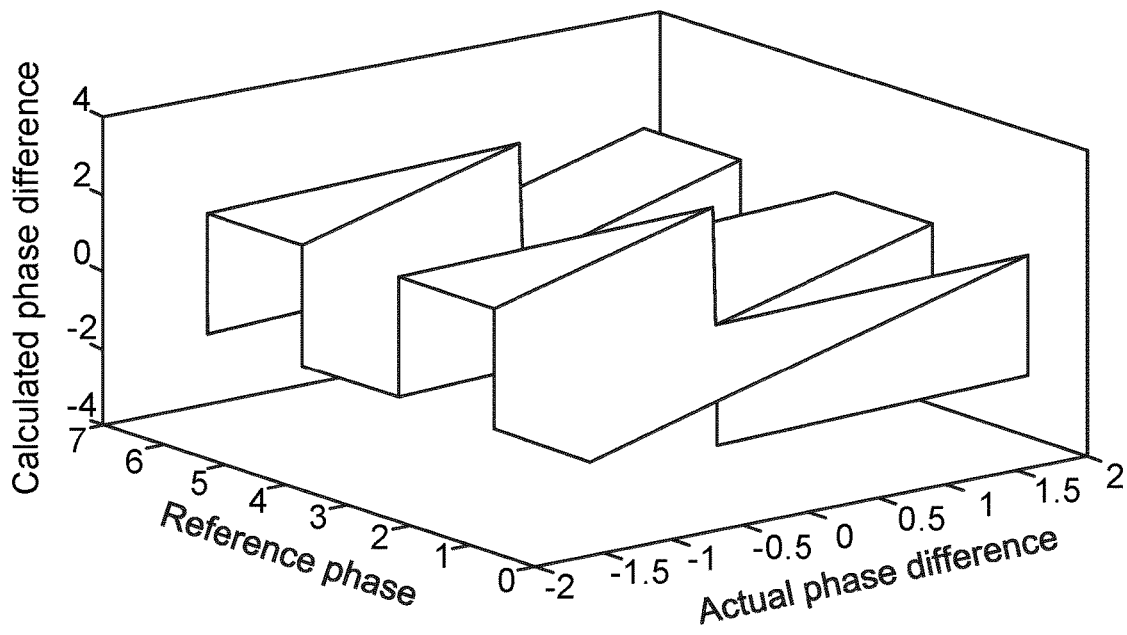
FIGS. 4A-D are schematic graphs illustrating the result of various phase difference calculations based on IQ samples obtained using the two antennas of FIG. 1.

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

FIG. 1 is a schematic diagram showing an environment in which embodiments presented herein can be applied.

Access to a physical space 16 is restricted by a physical barrier 15 which is selectively unlockable. For instance, the barrier 15 can be a door, gate, hatch, window, etc. In order to unlock the barrier 15, an access control device 13 is provided. The access control device 13 is connected to a physical lock device 11, which is controllable by the access control device 13 to be set in an unlocked state or locked state. The access control device 13 can be separate from the physical lock device 11 (as shown) or the access control device 13 can form part of the physical lock device 11 (not shown).

The access control device 13 communicates with a mobile key device 2 over a wireless interface using a plurality of antennas 5a-b. The mobile key device 2 is any suitable device portable by a user and which can be used for authentication over the wireless interface. The mobile key device 2 is typically carried or worn by the user and may be implemented as a mobile phone, a smartphone, a key fob, wearable device, smart phone case, RFID (Radio Frequency Identification) card, etc. In FIG. 1, only two antennas 5a-b can be seen. However, there can be one or more antennas provided in connection with the access control device 13.

Using wireless communication, the authenticity and authority of the mobile key device can be checked in an unlock procedure, e.g. using a challenge and response scheme, after which the access control device grants or denies access. Alternatively or additionally, the mobile key device can be used in the same way to, when granted, trigger the barrier to be opened e.g. using a door opener.

A position determiner 1 is connected to the access control device 13 or the antennas 5a-5b to obtain samples of signals received from the mobile key device 2. In this way, a phase difference can be determined between the samples to thereby determine an angle of arrival of the signal from the mobile key device 2. The angle of arrival can be used to determine, more or less accurately, a position of the mobile key device, e.g. to determine whether the mobile key device 2 is within an active area in relation to the barrier 15. The active area is defined such that it is beneficiary to trigger access control when the mobile key device is located in the active area.

The position determiner 1 can be separate from the access control device 13 (as shown) or the position determiner 1 access control device 13 can form part of the access control device 13 (not shown), in which case the access control device 13 is a host device for the position determiner 1.

Providing multiple antennas provides additional benefits. For instance, the antennas can be used for beam forming, multiple input/multiple output (MIMO) transmissions, redundancy between antennas, differential antennas, etc.

When access is granted, the access control device 13 sends an unlock signal to the lock device ii, whereby the lock device 11 is set in an unlocked state. In this embodiment, this can e.g. imply a signal over a wire-based communication, e.g. using a serial interface (e.g. RS485, RS232), Universal Serial Bus (USB), Ethernet, or even a simple electric connection (e.g. to the lock device 11), or alternatively a wireless interface. When the lock device 11 is in an unlocked state, the barrier 15 can be opened and when the lock device 11 is in a locked state, the barrier 15 cannot be opened. In this way, access to a closed space 16 is controlled by the access control device 13. It is to be noted that the access control device 13 and/or the lock device 11 can be mounted in a fixed structure (e.g. wall, frame, etc.) by the physical barrier 15 (as shown) or in the physical barrier 15 (not shown).

FIG. 2 is a flow chart illustrating embodiments of methods for determining a position of a mobile key device. The method is performed in a position determiner. The flow chart will be explained with further reference to FIG. 3, illustrating the samples in an IQ plane.

In an obtain samples 40 step, the position determiner obtains a first sample point S1 comprising a first in-phase (I) value I1 and a first quadrature (Q), value Q1. The position determiner further obtains a second sample point S2, comprising a second I value I2 and a second Q value Q2. The first sample point S1 indicates a signal received from the mobile key device using a first antenna and the second sample point indicates a signal received from the mobile key device using a second antenna. The samples are obtained directly or indirectly from the antennas.

Optionally, this comprises obtaining multiple instances of the first sample point S1 and calculating an average of the multiple instances of the first sample point S1 for subsequent processing; and obtaining multiple instances of the second sample point S2 and calculating an average of the multiple instances of the second sample point S2 for subsequent processing. This improves sample reliability which can otherwise vary, e.g. due to noise.

In a conditional transform step 41, it is determined when a transformation condition is true. The transformation condition is determined to be true by determining that the obtained first sample point is in the first quadrant and the obtained second sample point is in the second quadrant, that the obtained first sample point is in the second quadrant and the obtained second sample point is in the first quadrant, that the obtained first sample point is in the third quadrant and the obtained second sample point is in the fourth quadrant, or that the obtained first sample point is in the fourth quadrant and the obtained second sample point is in the third quadrant.

In other words, the transformation condition is true when any one of the mentioned combination of locations of the first sample point and the second sample point is true.

When this transformation condition is determined to be true, the method proceeds to a transform step 42. Otherwise, the method proceeds to a determine phase difference step 44.

In the transform step 42, the position determiner transforms (when the transformation condition is true as determined in step 41) the first sample point S1 and the second sample point S2.

Optionally, the samples and/or the transformations are repeated many times and averaged to improve sample reliability.

In a quadrant based transformation embodiment, the transformation comprises transforming the obtained first sample point and the obtained second sample point according to the following:

setting the I value of a first transformed sample point I1' to the Q value of the obtained first sample point Q1,
setting the Q value of the first transformed sample point Q1' to the inverse of the I value of the obtained first sample point, $-1*I1$,
setting the I value of a second transformed sample point I2' to the inverse of the Q value of the obtained second sample point, $-1*Q2$,
setting the Q value of the second transformed sample point Q2' to the I value of the obtained second sample point I2.

In this context, applying the inverse to a value is to be construed as multiplying by the constant $-1$, i.e. reversing the sign from plus to minus or vice versa.

In this case, the transformation condition is true when the obtained first sample point S1 is in the first quadrant and the obtained second sample point S2 is in the second quadrant, when the obtained first sample point S1 is in the second quadrant and the obtained second sample point S2 is in the first quadrant, when the obtained first sample point S1 is in the third quadrant and the obtained second sample point S2 is in the fourth quadrant, or when the obtained first sample point S1 is in the fourth quadrant and the obtained second sample point S2 is in the third quadrant.

When the obtained first sample point S1 and the obtained second sample point S2 do not (collectively) satisfy the transformation condition, the samples S1, S2 are not transformed.

This embodiment is applicable when the distance between the antennas is less than or equal to half a wavelength.

This embodiment can be summarised in Table 1 shown below.

TABLE 1

| | | Sample transformation | | | |
|---|---|---|---|---|---|
| S1 quadrant | S2 quadrant | Transformed I1 | Transformed Q1 | Transformed I2 | Transformed Q2 |
| 1 | 2 | Q1 | I1*(−1) | Q2*(−1) | I2 |
| 2 | 1 | Q1 | I1*(−1) | Q2*(−1) | I2 |
| 3 | 4 | Q1 | I1*(−1) | Q2*(−1) | I2 |
| 4 | 3 | Q1 | I1*(−1) | Q2*(−1) | I2 |

For each row in Table 1, the combination of values in the first two columns, S1 quadrant and S2 quadrant, indicates that that that particular combination of S1 quadrant and S2 quadrant implies that the transformation condition is true.

In an alternative dot multiplication embodiment, the transformation comprises calculating a phase difference point S3 by dot multiplying, in a complex IQ plane, the first sample point S1 with the conjugate of the second sample point S2. The phase difference point S3 represents a phase difference between the first sample point S1 and the second sample point S2. This is expressed in formula (1):

$$S3 = (I1 + Q1i) \cdot (I2 + (-1 \cdot Q2)i) \qquad (1)$$

In this embodiment, the transformation condition is always true.

Optionally, the phase difference point S3 is calculated many times (from many respective instances of S1 and S2) and averaged to improve reliability. Alternatively, the phase difference point S3 can be calculated on values which have already been averaged, as described above.

This embodiment is applicable when the distance between the antennas is between half a wavelength and one wavelength. Nevertheless, it can also be used when the distance between the antennas is less than half a wavelength, even if the embodiment described below (quadrant-based transformation) can be more computationally effective and accurate for distances between the antennas being less than half a wavelength.

In the determine phase difference step 44, the position determiner determines the phase difference between the first sample point S1 and the second sample point S2 by applying an inverse tangent function based on the result of the transforming. For instance, the inverse tangent function can be applied directly on the result of the transforming.

When the phase different point S3 has previously been determined, a four-quadrant arctangent function is applied on the phase difference point. For instance, arctan2 can be used, which is defined for four quadrants. As known in the art per se, arctan2 takes two quantities (e.g. in a complex number or as separate components) as input, compared to one quantity for arctan, to allow the determination of angle in all four quadrants. The I value I3 and the Q value Q3 of S3 then make up the two arguments as input for arctan2.

In the quadrant-based transformation embodiment, this step comprises applying an inverse tangent function, which can be a conventional two-quadrant inverse tangent function, e.g. arctan.

Optionally, the phase difference is calculated several times and averaged to improve reliability of phase difference determination. In other words, in such a case, the phase difference is determined several times and the several phase differences are averaged for subsequent processing.

In a determine position step 46, the position determiner determines the position of the mobile key device based on the phase difference. The phase difference is used to determine an incidence angle to the two antennas. Optionally, the incidence angle is determined several times and averaged to reduce noisy determinations. The incidence angle can be used in itself to broadly determine where the mobile key device is, e.g. inside or outside the barrier. Alternatively, the previous steps are repeated for multiple pairs of antennas, to more accurately determine the position of the mobile key device.

FIGS. 4A-D are schematic graphs illustrating the result of various phase difference calculations based on IQ samples obtained using the two antennas of FIG. 1. These graphs illustrate the relationship between actual phase difference between two samples, a reference phase and a calculated phase difference, φdiff. All values are in radians. The reference phase represents the phase of one of the samples, e.g. S1, and the actual phase difference represents the phase difference between the reference phase S1 and the other sample S2. If the calculated phase difference is correct, its value is equal to the actual phase difference, regardless of the value of the reference phase S1.

In FIG. 4A, the calculated phase difference is a traditional inverse tangent function, arctan, calculated according to:

$$\phi diff = \arctan(Q2/I2) - \arctan(Q1/I1) \qquad (2)$$

The phase difference defines the angle in relation to the line intersecting the two antennas. As seen, there are several discontinuities in the graph, which occur when the calculated phase difference φdiff incorrectly shifts between the actual phase difference and (x—the actual phase difference), where $0 \leq x \leq 2\pi$.

Figure 4B:
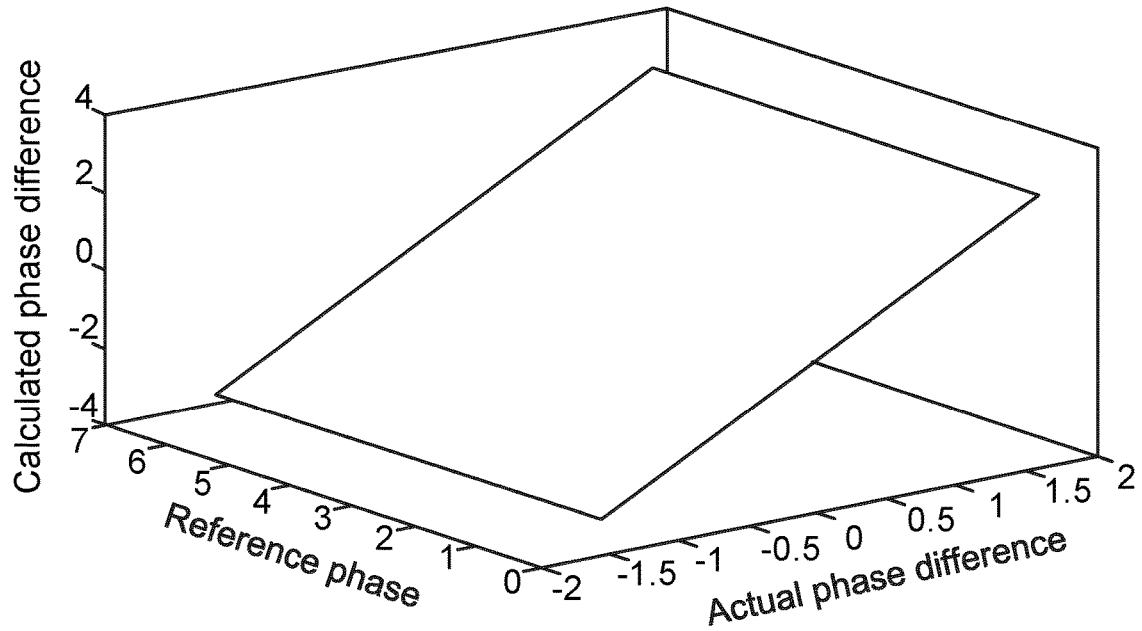

In FIG. 4B, the calculated phase difference is based on the quadrant-based transformation embodiment mentioned above. Here, the calculated phase difference is equal to the actual phase difference, regardless of the reference phase, when the actual phase difference is in the range of $-\pi/2$ to $\pi/2$. In other words, the calculated phase difference is here ideal for the disclosed range, due to the distance between the antennas is small enough, less than (or equal to) half a wavelength.

Figure 4C:
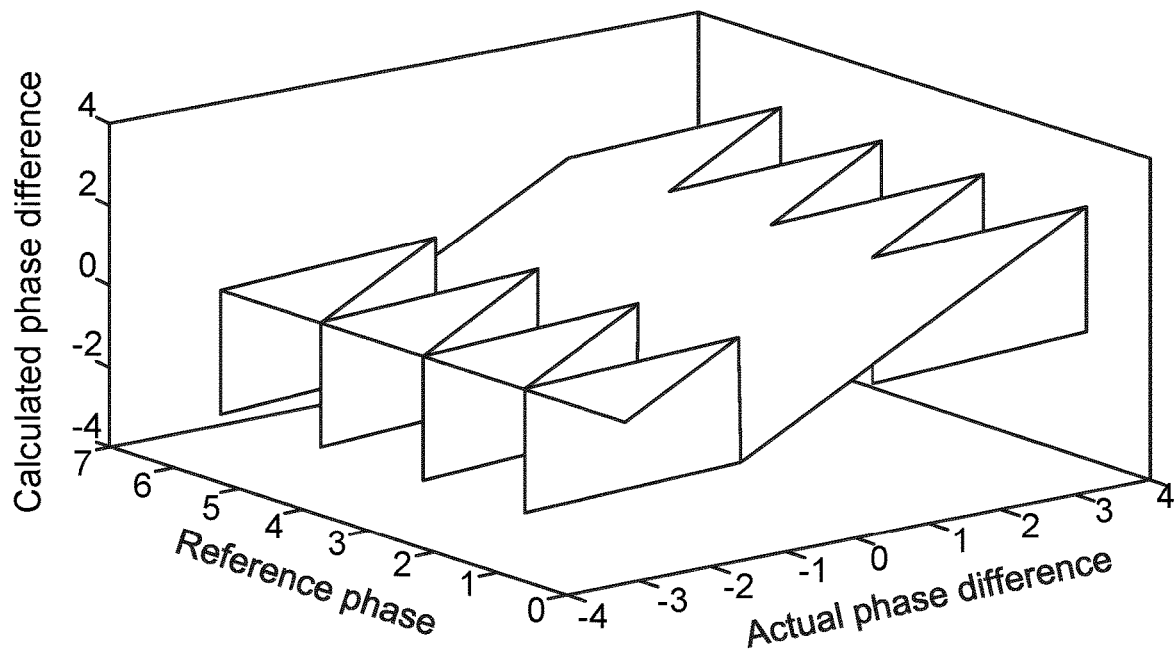

In FIG. 4C, the calculated phase difference is based on the quadrant-based transformation embodiment mentioned above, but shown for a larger range of actual phase difference than shown in FIG. 4B. Now, the issues with this embodiment is shown when the actual phase difference is outside the range of $-\pi/2$ to $\pi/2$, which, again, is due to that arctan is only unambiguously defined for $-\pi/2$ to $\pi/2$.

Figure 4D:
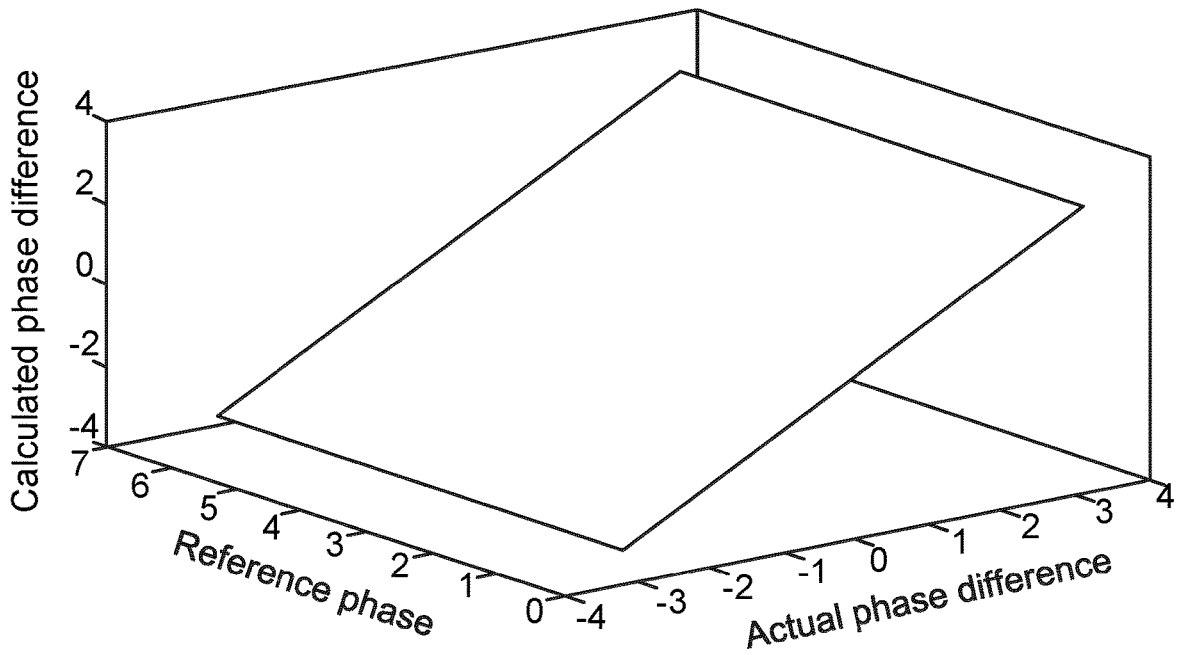

In FIG. 4D, the calculated phase difference is based on the dot multiplication embodiment. This embodiment is based on four quadrant inverse tangent calculation, e.g. arctan2, whereby the calculated phase difference is equal to the actual phase difference, regardless of the reference phase, in the range of $-\pi$ to $\pi$ for the actual phase difference.

The dot multiplication embodiment is thus ideal for a larger operating range of the actual phase difference, being more generally applicable for greater distances between the antennas. Greater distance between antennas may increase capability of separating signals and may improve accuracy. However, the quadrant-based transformation embodiment is less demanding computationally, and can thus be applied when the phase difference is known (or reasonably expected) to be within $-\pi/2$ to $\pi/2$.

Figure 5:
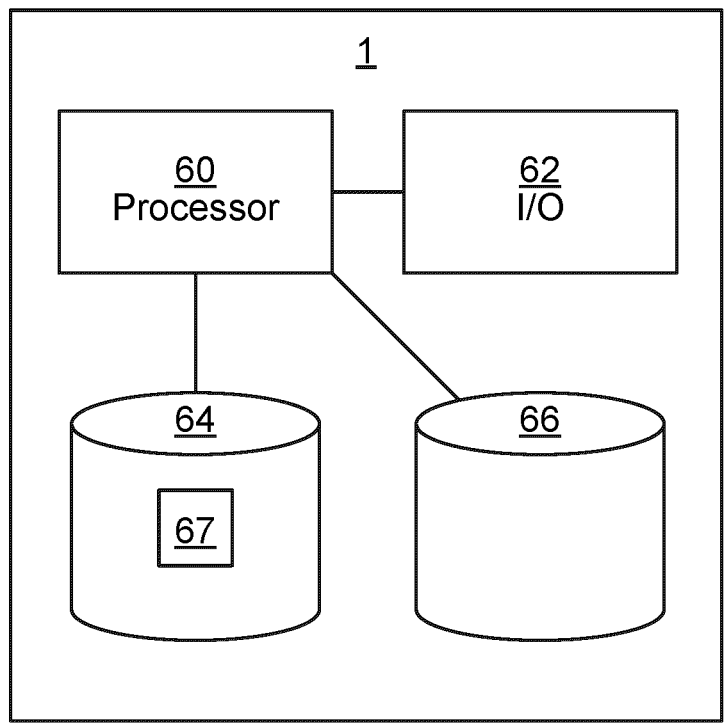
FIG. 5 is a schematic diagram illustrating an embodiment of the position determiner of FIG. 1.

FIG. 5 is a schematic diagram illustrating components of the position determiner 1 of FIG. 1. It is to be noted that one or more of the mentioned components can be shared with a host device, such as the access control device, when used. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The position determiner further comprises an I/O interface 62 for communicating with external and/or internal entities. Optionally, the I/O interface 62 also includes a user interface.

Other components of the position determiner 1 are omitted in order not to obscure the concepts presented herein.

Figure 6:
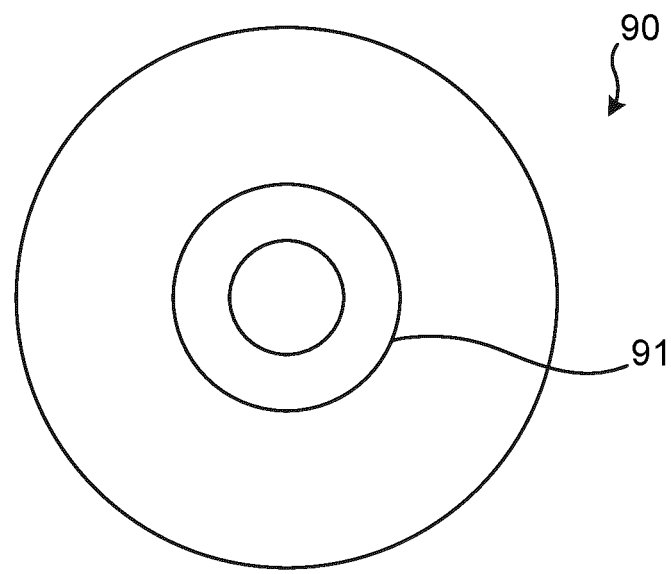
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a list of embodiments from another perspective, enumerated with roman numerals.

i. A method for determining a position of a mobile key device, the method being performed in a position determiner and comprising the steps of:

obtaining a first sample point comprising a first in-phase, I, value and a first quadrature, Q, value, and a second sample point, comprising a second I value and a second Q value, the first sample point indicating a signal received from the mobile key device using a first antenna and the second sample point indicating a signal received from the mobile key device using a second antenna;

transforming, when a transformation condition is true, the first sample point and the second sample point;

determining the phase difference between the first sample point and the second sample point by applying an inverse tangent function based on the result of the transforming; and determining the position of the mobile key device based on the phase difference.

ii. The method according to embodiment i, wherein the step of transforming comprises calculating a phase difference point by dot multiplying, in a complex IQ plane, the first sample point with the conjugate of the second sample point, the phase difference point representing a phase difference between the first sample point and the second sample point; and wherein the step of determining the phase difference comprises applying a four-quadrant arctangent function on the phase difference point.

iii. The method according to embodiment i, wherein the step of transforming comprises transforming the obtained first sample point and the obtained second sample point, when a transformation condition is true, according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point;

wherein the transformation condition is true when the obtained first sample point is in the first quadrant and the obtained second sample point is in the second quadrant, when the obtained first sample point is in the second quadrant and the obtained second sample point is in the first quadrant, when the obtained first sample point is in the third quadrant and the obtained second sample point is in the fourth quadrant, or when the obtained first sample point is in the fourth quadrant and the obtained second sample point is in the third quadrant.

iv. A position determiner for determining a position of a mobile key device, the position determiner comprising:

a processor; and a memory storing instructions that, when executed by the processor, cause the position determiner to:

obtain a first sample point and a second sample point, each one of the sample points comprising an in-phase, I, value and a quadrature, Q, value, the first sample point indicating a signal received from the mobile key device using a first antenna and the second sample point indicating a signal received from the mobile key device using a second antenna;

transform, when a transformation condition is true, the first sample point and the second sample point;

determine the phase difference between the first sample point and the second sample point by applying an inverse tangent function based on the result of the transforming; and determine the position of the mobile key device based on the phase difference.

v. The position determiner according to embodiment iv, wherein the instructions to transform comprise instructions that, when executed by the processor, cause the position determiner to calculate a phase difference point by dot multiplying, in a complex IQ plane, the first sample point with the conjugate of the second sample point, the phase difference point representing a phase difference between the first sample point and the second sample point; and wherein the instructions to determine the phase difference comprise instructions that, when executed by the processor, cause the position determiner to apply a four-quadrant arctangent function on the phase difference point.

vi. The position determiner according to embodiment iv, wherein the instructions to transform comprise instructions that, when executed by the processor, cause the position determiner to transform the obtained first sample point and the obtained second sample point, when a transformation condition is true, according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point;

wherein the transformation condition is true when the obtained first sample point is in the first quadrant and the obtained second sample point is in the second quadrant, when the obtained first sample point is in the second quadrant and the obtained second sample point is in the first quadrant, when the obtained first sample point is in the third quadrant and the obtained second sample point is in the fourth quadrant, or when the obtained first sample point is in the fourth quadrant and the obtained second sample point is in the third quadrant.

vii. A computer program for determining a position of a mobile key device, the computer program comprising computer program code which, when run on a position determiner causes the position determiner to:

obtain a first sample point and a second sample point, each one of the sample points comprising an in-phase, I, value and a quadrature, Q, value, the first sample point indicating a signal received from the mobile key device using a first antenna and the second sample point indicating a signal received from the mobile key device using a second antenna;

transform, when a transformation condition is true, the first sample point and the second sample point;

determine the phase difference between the first sample point and the second sample point by applying an inverse tangent function based on the result of the transforming; and determine the position of the mobile key device based on the phase difference.

viii. A computer program product comprising a computer program according to embodiment vii and a computer readable means on which the computer program is stored.

ix. A method for determining a position of a mobile key device, the method being performed in a position determiner and comprising the steps of:

obtaining a first sample point comprising a first in-phase, I, value and a first quadrature, Q, value, and a second sample point, comprising a second I value and a second Q value, the first sample point indicating a signal received from the mobile key device using a first antenna and the second sample point indicating a signal received from the mobile key device using a second antenna;

transforming the first sample point and the second sample point when the obtained first sample point is in the first quadrant and the obtained second sample point is in the second quadrant, when the obtained first sample point is in the second quadrant and the obtained second sample point is in the first quadrant, when the obtained first sample point is in the third quadrant and the obtained second sample point is in the fourth quadrant, or when the obtained first sample point is in the fourth quadrant and the obtained second sample point is in the third quadrant, wherein the transforming comprises transforming the obtained first sample point and the obtained second sample point according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point;

determining the phase difference between the first sample point and the second sample point by applying an inverse tangent function based on the result of the transforming; and determining the position of the mobile key device based on the phase difference.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining a position of a mobile key device the method being performed by a position determiner and comprising the steps of:

obtaining a first sample point comprising a first in-phase, I, value and a first quadrature, Q, value, and a second sample point, comprising a second I value and a second Q value, the first sample point indicating a signal received from the mobile key device using a first antenna and the second sample point indicating a signal received from the mobile key device using a second antenna;

determining that a transformation condition is true by determining that the obtained first sample point is in the first quadrant and the obtained second sample point is in the second quadrant, that the obtained first sample point is in the second quadrant and the obtained second sample point is in the first quadrant, that the obtained first sample point is in the third quadrant and the obtained second sample point is in the fourth quadrant, or that the obtained first sample point is in the fourth quadrant and the obtained second sample point is in the third quadrant;

transforming the first sample point and the second sample point according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point;

determining the phase difference between the first sample point and the second sample point by applying an inverse tangent function based on the result of the transforming; and determining the position of the mobile key device based on the phase differences.

2. The method according to claim 1, wherein the step of obtaining comprises obtaining multiple instances of the first sample point and calculating an average of the multiple instances of the first sample point for subsequent processing; and obtaining multiple instances of the second sample point and calculating an average of the multiple instances of the second sample point for subsequent processing.

3. The method according to claim 1, wherein the step of determining the phase difference comprises determining the phase difference several times and averaging the several phase differences for subsequent processing.

4. A position determiner for determining a position of a mobile key device, the position determiner comprising:
a processor; and
a memory storing instructions that, when executed by the processor, cause the position determiner to:
obtain a first sample point and a second sample point, each one of the sample points comprising an in-phase, I, value and a quadrature, Q, value, the first sample point indicating a signal received from the mobile key device using a first antenna and the second sample point indicating a signal received from the mobile key device using a second antenna;
determine that a transformation condition is true by determining that the obtained first sample point is in the first quadrant and the obtained second sample point is in the second quadrant, that the obtained first sample point is in the second quadrant and the obtained second sample point is in the first quadrant, that the obtained first sample point is in the third quadrant and the obtained second sample point is in the fourth quadrant, or that the obtained first sample point is in the fourth quadrant and the obtained second sample point is in the third quadrant;
transform the first sample point and the second sample point according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point;
determine the phase difference between the first sample point and the second sample point by applying an inverse tangent function based on the result of the transforming; and
determine the position of the mobile key device based on the phase difference.

5. The position determiner according to claim 4, wherein the instructions to obtain comprise instructions that, when executed by the processor, cause the position determiner to obtain multiple instances of the first sample point and calculate an average of the multiple instances of the first sample point for subsequent processing; and
obtain multiple instances of the second sample point and calculate an average of the multiple instances of the second sample point for subsequent processing.

6. The position determiner according to claim 4, wherein the instructions to determine the phase difference comprise instructions that, when executed by the processor, cause the position determiner to determine the phase difference several times and averaging the several phase differences for subsequent processing.

7. A computer program product for determining a position of a mobile key device, the computer program product comprising a non-transitory computer readable medium having a computer program code embodied therein which, when run on a position determiner causes the position determiner to:
obtain a first sample point and a second sample point, each one of the sample points comprising an in-phase, I, value and a quadrature, Q, value, the first sample point indicating a signal received from the mobile key device using a first antenna and the second sample point indicating a signal received from the mobile key device using a second antenna;
determine that a transformation condition is true by determining that the obtained first sample point is in the first quadrant and the obtained second sample point is in the second quadrant, that the obtained first sample point is in the second quadrant and the obtained second sample point is in the first quadrant, that the obtained first sample point is in the third quadrant and the obtained second sample point is in the fourth quadrant, or that the obtained first sample point is in the fourth quadrant and the obtained second sample point is in the third quadrant;
transform the first sample point and the second sample point according to the following: setting the I value of a first transformed sample point to the Q value of the obtained first sample point, setting the Q value of the first transformed sample point to the inverse of the I value of the obtained first sample point, setting the I value of a second transformed sample point to the inverse of the Q value of the obtained second sample point, setting the Q value of the second transformed sample point to the I value of the obtained second sample point;
determine the phase difference between the first sample point and the second sample point by applying an inverse tangent function based on the result of the transforming; and
determine the position of the mobile key device based on the phase difference.

8. A computer program product comprising a computer program according to claim 7 and a computer readable means on which the computer program is stored.

* * * * *